(12) United States Patent
Vogt et al.

(10) Patent No.: US 12,121,945 B2
(45) Date of Patent: Oct. 22, 2024

(54) SHEET STEEL HAVING A DETERMINISTIC SURFACE STRUCTURE

(71) Applicant: ThyssenKrupp Steel Europe AG, Duisburg (DE)

(72) Inventors: Oliver Vogt, Dortmund (DE); Fabian Junge, Düsseldorf (DE); Burak William Cetinkaya, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 14 days.

(21) Appl. No.: 17/641,695

(22) PCT Filed: Sep. 8, 2020

(86) PCT No.: PCT/EP2020/075056
§ 371 (c)(1),
(2) Date: Jun. 14, 2022

(87) PCT Pub. No.: WO2021/052812
PCT Pub. Date: Mar. 25, 2021

(65) Prior Publication Data
US 2023/0201899 A1 Jun. 29, 2023

(30) Foreign Application Priority Data
Sep. 17, 2019 (DE) .................... 10 2019 214 136.6

(51) Int. Cl.
*B32B 15/01* (2006.01)
*B21B 1/22* (2006.01)
(Continued)

(52) U.S. Cl.
CPC ................ *B21B 1/22* (2013.01); *B21B 1/227* (2013.01); *B21B 27/005* (2013.01); *B21B 27/02* (2013.01);
(Continued)

(58) Field of Classification Search
CPC . B21B 2261/14; B21B 2001/228; B21B 1/22; B21B 1/227; B21B 27/005;
(Continued)

(56) References Cited

U.S. PATENT DOCUMENTS

| | | | |
|---|---|---|---|
| 4,798,772 A | 1/1989 | Furukawa | |
| 6,261,702 B1 * | 7/2001 | McGuire | B21B 1/227 428/600 |

(Continued)

FOREIGN PATENT DOCUMENTS

| | | |
|---|---|---|
| CN | 110073027 A | 7/2019 |
| DE | 102007032874 A1 | 1/2009 |

(Continued)

OTHER PUBLICATIONS

Machine Translation, Aihara et al., JP 01-127104 A, May 1989. (Year: 1989).*

(Continued)

*Primary Examiner* — Michael E. La Villa
(74) *Attorney, Agent, or Firm* — RMCK Law Group PLC

(57) ABSTRACT

The invention relates to a steel sheet skin-pass rolled with a deterministic surface structure, and to a method for producing it.

11 Claims, 1 Drawing Sheet

(51) Int. Cl.
| | |
|---|---|
| *B21B 27/00* | (2006.01) |
| *B21B 27/02* | (2006.01) |
| *B32B 3/02* | (2006.01) |
| *B32B 3/26* | (2006.01) |
| *B32B 3/30* | (2006.01) |
| *B32B 15/04* | (2006.01) |
| *B32B 15/08* | (2006.01) |
| *B32B 15/18* | (2006.01) |
| *C21D 7/04* | (2006.01) |
| *C21D 9/48* | (2006.01) |
| *C22C 18/00* | (2006.01) |
| *C22C 18/04* | (2006.01) |
| *C23C 2/02* | (2006.01) |
| *C23C 2/04* | (2006.01) |
| *C23C 2/06* | (2006.01) |
| *C23C 2/26* | (2006.01) |
| *C23C 2/36* | (2006.01) |
| *C23C 2/40* | (2006.01) |
| *C23C 28/02* | (2006.01) |
| *C23C 30/00* | (2006.01) |
| *C25D 3/22* | (2006.01) |
| *C25D 7/06* | (2006.01) |

(52) U.S. Cl.
CPC .......... *B21B 27/021* (2013.01); *B32B 3/02* (2013.01); *B32B 3/26* (2013.01); *B32B 3/263* (2013.01); *B32B 3/30* (2013.01); *B32B 15/012* (2013.01); *B32B 15/013* (2013.01); *B32B 15/04* (2013.01); *B32B 15/043* (2013.01); *B32B 15/08* (2013.01); *B32B 15/18* (2013.01); *C21D 7/04* (2013.01); *C21D 9/48* (2013.01); *C22C 18/00* (2013.01); *C22C 18/04* (2013.01); *C23C 2/02* (2013.01); *C23C 2/04* (2013.01); *C23C 2/06* (2013.01); *C23C 2/26* (2013.01); *C23C 2/36* (2013.01); *C23C 2/40* (2013.01); *C23C 28/021* (2013.01); *C23C 28/025* (2013.01); *C23C 30/00* (2013.01); *C23C 30/005* (2013.01); *C25D 3/22* (2013.01); *C25D 7/0614* (2013.01); *B21B 2001/228* (2013.01); *B21B 2261/14* (2013.01); *B21B 2263/02* (2013.01); *C21D 2221/00* (2013.01); *Y10T 428/12229* (2015.01); *Y10T 428/12389* (2015.01); *Y10T 428/12396* (2015.01); *Y10T 428/12556* (2015.01); *Y10T 428/12569* (2015.01); *Y10T 428/12799* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01); *Y10T 428/263* (2015.01); *Y10T 428/264* (2015.01); *Y10T 428/265* (2015.01); *Y10T 428/27* (2015.01); *Y10T 428/273* (2015.01)

(58) Field of Classification Search
CPC ... B21B 27/02; B21B 27/021; B21B 2263/02; C25D 3/22; C25D 7/0614; B32B 15/013; B32B 15/012; B32B 15/04; B32B 15/043; B32B 15/08; B32B 15/18; B32B 3/02; B32B 3/26; B32B 3/263; B32B 3/30; C21D 7/04; C21D 9/48; C21D 2221/00; C22C 18/04; C22C 18/00; C23C 2/06; C23C 2/26; C23C 2/40; C23C 2/02; C23C 2/04; C23C 2/36; C23C 28/021; C23C 28/025; C23C 30/00; C23C 30/005; Y10T 428/2495; Y10T 428/24967; Y10T 428/27; Y10T 428/263; Y10T 428/264; Y10T 428/265; Y10T 428/273; Y10T 428/12799; Y10T 428/12972; Y10T 428/12979; Y10T 428/12993; Y10T 428/12569; Y10T 428/12229; Y10T 428/12556; Y10T 428/12389; Y10T 428/12396

See application file for complete search history.

(56) References Cited

U.S. PATENT DOCUMENTS

| | | | |
|---|---|---|---|
| 2015/0209848 A1* | 7/2015 | Kopplin | B23K 26/0823 428/659 |
| 2016/0138167 A1* | 5/2016 | Chaleix | C25D 5/48 427/154 |
| 2020/0071809 A1 | 3/2020 | Jeon et al. | |

FOREIGN PATENT DOCUMENTS

| | | |
|---|---|---|
| DE | 102012017703 A1 | 3/2014 |
| DE | 102016102723 | 6/2017 |
| DE | 102019214133 A1 | 3/2021 |
| DE | 102019214135 A1 | 3/2021 |
| EP | 0540005 A1 | 5/1993 |
| EP | 1584396 A2 | 10/2005 |
| EP | 2006037 A1 | 12/2008 |
| EP | 2892663 B1 | 11/2016 |
| JP | S591636 A | 1/1984 |
| JP | 01127104 A * | 5/1989 |

OTHER PUBLICATIONS

DIN EN 1465—Adhesives—Determination of tensile lap-shear strength of bonded assemblies, Jul. 2009.
DIN EN 1669—Aluminum and aluminum alloys—Test methods, Nov. 1981.
DIN EN ISO 10365—Adhesives—Designation of main failure patterns—Aug. 1995.
DIN EN ISO 4287—Geometrical Product Specifications (GPS)—Surface texture: Profile method—Terms, definitions and surface texture parameters, Jan. 2009.
International Search Report and Written Opinion for International Application No. PCT/EP2020/075056 mailed Dec. 11, 2020.
Mare De C et al. "Development of the Sibetex Sheet Having Excellent Drawability and Paint Appearance" Revue de Metallurgie—Cahiers D'Informations Techniques, vol. 94, No. 6, Jun. 1, 1997, pp. 827-836.
Chinese Office Action for CN Application No. 20208065190.9 mailed Jun. 8, 2024.
Chinese Search Report for CN Application No. 2020800651909 mailed Jun. 6, 2024.
German Office Action for DE Application No. 102019214136.6 mailed Jul. 29, 2024.

* cited by examiner

SHEET STEEL HAVING A DETERMINISTIC SURFACE STRUCTURE

CROSS-REFERENCE TO RELATED APPLICATIONS

This application is a 371 U.S. National Stage of International Application No. PCT/EP2020/075056, filed Sep. 8, 2020, which claims the benefit of German Patent Application No. 10 2019 214 136.6 filed Sep. 17, 2019. The disclosures of each of the above applications are incorporated herein by reference in their entirety.

FIELD

The invention relates to a steel sheet skin-pass rolled with a deterministic surface structure. Furthermore, the invention relates to a method for producing a steel sheet skin-pass rolled with a deterministic surface structure.

BACKGROUND

Generic steel sheets skin-pass rolled with a deterministic surface structure are known from the prior art; see for example patent document EP 2 892 663 B1.

With regard to the known prior art, there is a need for optimization, in particular with a view to reducing the need for process media and/or making process media available in accordance with requirements.

The object is therefore to provide a steel sheet skin-pass rolled with a deterministic surface structure, which steel sheet provides equivalent or better properties in comparison with the prior art.

SUMMARY

The provision of a defined surface structure on a skin-pass rolled steel sheet is essential for further processes, in particular in the further processing industry for the production of components for automobiles. In the course of component production, in particular in forming processes, it is advantageous if process media used, such as oil and/or lubricants, are present homogeneously and in the necessary applied amounts at locations that are relevant to the forming process. These locations that are relevant to the forming process are generally the surface areas of contact between the steel sheet and the shaping tools-accordingly not the impressions, in which the process media preferably collect, in the steel sheets but rather the surface in the form of the surface area of the elevations on the steel sheets. The inventors have found that, in the case of a steel sheet skin-pass rolled with a deterministic surface structure, equivalent or better properties can be provided in comparison with the prior art if the surface structure is impressed into the steel sheet starting from a surface of the steel sheet, wherein the surface structure comprises a flank region, which runs from the surface to a trough region, wherein, according to the invention, at least the flank region has a roughness Ra of greater than 20 nm in order to minimize the need for process medium and/or to store the process medium closer to or adjacent to locations that are relevant to the forming process. Defined setting of the roughness Ra (arithmetic mean roughness value), with the method for determining the Ra value being specified in DIN ISO EN 4287, at least in the flank region of the surface structure with a roughness Ra of greater than 20 nm, in particular greater than 50 nm, preferably greater than 100 nm, preferably greater than 150 nm, more preferably greater than 200 nm, makes it possible in particular to targetedly influence the local distribution of process medium, wherein, in particular due to the impressing according to the invention of the deterministic surface structure, a steel sheet with a deliberate modeling of the flank region results in better process-relevant properties of the surface of the steel sheet, in order to bring the process medium specifically closer to the locations that are relevant to the forming process. The targetedly set roughness Ra makes it possible to provide a corresponding reaction surface area or boundary layer. The roughness Ra in the flank region can be limited as required to at most 800 nm, in particular at most 700 nm, preferably at most 600 nm, preferably at most 500 nm, particularly preferably at most 400 nm, since the surface of the steel sheet undergoes large changes in shape, in particular at the outer grain of the steel sheet, especially in one of the subsequent shaping steps, such as during deep drawing, stretching or bending. At this location, in particular in combination with for example highly pronounced textures of the deterministic surface structure, it is possible that, due to the notch effect, stress concentrations occur and consequently, if a coat is present, the coat breaks down.

BRIEF DESCRIPTION

Figure 1:
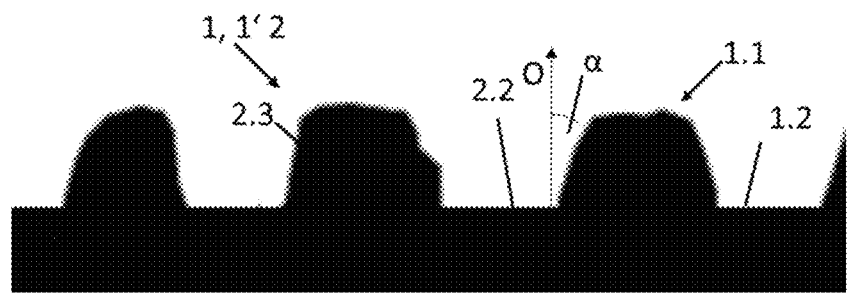
FIG. 1) shows a schematic partial sectional view of an exemplary embodiment according to the invention of a steel sheet skin-pass rolled with a deterministic surface structure, FIGS. 2a), 2b) and 2c) show respective schematic partial sectional views of different surface structures on a skin-pass rolled steel sheet according to the prior art in FIGS. 2a) and 2b) and a surface structure according to the invention on a skin-pass rolled steel sheet in FIG. 2c), and FIGS. 3a) and 3b) show, respectively in an SEM image, a part of a coated steel sheet, skin-pass rolled with a deterministic surface structure, according to the prior art (FIG. 3a)) and as per an exemplary embodiment according to the invention (FIG. 3b)).

A deterministic surface structure is to be understood as meaning recurring surface structures which have a defined shape and/or configuration; cf. EP 2 892 663 B1. In particular, this additionally includes surfaces having a (virtually) stochastic appearance, which, however, are applied by a deterministic texturing method and are consequently composed of deterministic shaped elements.

A steel sheet is generally to be understood as meaning a flat steel product which can be provided in sheet form or in blank form or in strip form.

Further advantageous embodiments and developments are disclosed in the following description. One or more features from the claims, the description and also the drawing may be linked with one or more other features therefrom to form further embodiments of the invention. It is also possible for one or more features from the independent claims to be linked by one or more other features.

According to one embodiment of the steel sheet according to the invention, the surface structure comprises a flank region which runs from the surface to a trough region and is formed at an angle of between 1° and 89° to the perpendicular of the steel sheet. The angle may in particular be between 50° and 87°, preferably between 60° and 85°, particularly preferably between 65° and 82°. The trough and flank region (negative shape) of the surface structure essentially corresponds to the surface (positive shape) on a skin-pass roller, which forms or impresses the surface structure by virtue of a corresponding action on the steel sheet. The flank region forming and running peripherally around the surface structure, together with the trough region connected in one piece to the flank region, defines a closed volume of the surface structure impressed into the steel sheet by means of skin-pass rolling. The closed volume, what is known as the empty volume, can be matched to a process medium, in particular oil, to be applied, for later processing by forming methods.

The geometric configuration (size and depth) of a deterministic surface structure (negative shape) on a skin-pass rolled steel sheet depends in particular on how the corresponding geometric structure (positive shape) has been/is configured on a skin-pass roller. Laser texturing methods are preferably used to be able to set targeted structures (positive shape) on the surface of a skin-pass roller by material removal. In particular, the targeted activation of the energy, the pulse duration and the selection of a suitable wavelength of a laser beam acting on the surface of the skin-pass roller can have a positive effect on the configuration of the structure(s). The time of interaction between the laser beam and the surface of the skin-pass roller increases with a long or longer pulse duration and more material on the surface of the skin-pass roller can be removed. A pulse leaves behind on the surface of the skin-pass roller a substantially circular crater or multiple substantially circular craters, which, after the skin-pass rolling operation, reproduce(s) the surface or the surface area of the elevations on the steel sheet and consequently the surface area of contact between the steel sheet and the shaping tool. Reducing the pulse duration affects the formation of a crater, in particular the diameter of the crater can be reduced. By reducing the pulse duration, in particular when using short or ultrashort pulse lasers, it is possible to targetedly set the geometric structure (positive shape) on the surface of a skin-pass roller in such a way as to thus texture a surface of the steel sheet in such a way that a defined roughness Ra can be created in the flank region of the surface structure of the skin-pass rolled steel sheet. This is achieved, for example, if the pulse duration of the laser used to texture the surface of the skin-pass roller is reduced, and therefore the geometric structure on the roller can be created with higher resolution. In particular owing to the high resolution and small crater surface area, which results from the shorter interaction between laser and skin-pass roller, it is possible on the flank region to targetedly set rougher surfaces and any desired gradients (angles) of the flank region.

The targeted setting of the roughness in the flank region and optionally the defined setting of the angle of the flank region can be of use not just for forming processes. In particular targetedly varying the angle coupled with setting the roughness in the flank region make it possible for the functionalization of the surface of the steel sheet to have more degrees of freedom.

By targetedly setting the roughness Ra in the flank region, it is thus possible to provide a defined and/or large reaction surface area, for example for a chemical (post) treatment which is in particular in the form of cleaning and/or phosphating, between the skin-pass rolled steel sheet and the process medium. It is preferably the case that, during cleaning, the targetedly set roughness Ra of the flank region provides a surface finish such that for example disruptive deposits on the boundary layer, in particular oxide coatings, can be removed at least partially and/or in certain regions relatively easily, in particular without adversely affecting the roughness of the surface structure in the flank region.

For example, it is also possible, essentially due to the targetedly set roughness in the flank region, for the suitability for adhesion of the steel sheet according to the invention to make available an optimum and/or large interface, in order to provide the adhesive with a corresponding reaction surface area.

According to one embodiment of the steel sheet according to the invention, the steel sheet is coated with a metallic coat, in particular with a zinc-based coat, which is applied by hot-dip coating. The coat may preferably contain, in addition to zinc and unavoidable impurities, additional elements such as aluminum with a content of up to 5% by weight and/or magnesium with a content of up to 5% by weight in the coat. Steel sheets with a zinc-based coat have very good cathodic corrosion protection and have been used in automotive construction for years. If improved corrosion protection is intended, the coat additionally comprises magnesium with a content of at least 0.3% by weight, in particular at least 0.6% by weight, preferably at least 0.9% by weight. Aluminum may be present as an alternative or in addition to magnesium with a content of at least 0.3% by weight, in order in particular to improve the bond of the coat to the steel sheet and in particular to substantially prevent iron from diffusing out of the steel sheet into the coat when the coated steel sheet undergoes heat treatment, so that the positive corrosion properties continue to be preserved. In this respect, the thickness of the coat may be between 1 and 15 µm, in particular between 2 and 12 µm, preferably between 3 and 10 µm. Below the minimum limit it is not possible to ensure adequate cathodic corrosion protection, and above the maximum limit there may be joining problems when the steel sheet according to the invention or a component manufactured therefrom is being connected to another component; in particular, if the maximum limit specified for the thickness of the coat is exceeded, a stable thermal joining and/or welding process cannot be ensured. During hot-dip coating, the steel sheets are first coated with a suitable coat and then fed for skin-pass rolling. The skin-pass rolling takes place after the steel sheet has been hot-dip coated.

According to an alternative embodiment of the steel sheet according to the invention, the steel sheet is coated with a metallic coat, in particular a zinc-based coat, which is applied by electrolytic coating. In this respect, the thickness of the coat may be between 1 and 10 µm, in particular between 1.5 and 8 µm, preferably between 2 and 5 µm. In comparison with hot-dip coating, it is possible first to skin-pass roll and then to electrolytically coat the steel sheet. Depending on the thickness of the coat, the roughness in the flank region can substantially be preserved even after the electrolytic coating. As an alternative, initial electrolytic coating and subsequent skin-pass rolling is also conceivable.

It is also conceivable that no coat, for example no metallic coat, is provided. It is also conceivable that the steel sheet has been/is coated with a non-metallic coat, for example in a strip coating installation, the steel sheet being skin-pass rolled before or after being coated with a non-metallic coat.

According to one embodiment of the steel sheet according to the invention, the in particular coated steel sheet is additionally provided with a process medium, in particular with an oil, wherein in particular the process medium is included in the surface structure with an applied amount of up to 2 g/m². On account of the dimensioning of the surface structure, process media are only scarcely needed, with the result that the applied amount is restricted to up to 2 g/m², in particular up to 1.5 g/m², preferably up to 1 g/m², preferably up to 0.6 g/m², more preferably up to 0.4 g/m². In particular due to the roughness and in combination with the corresponding reaction surface area in the flank region, the process medium is deposited after the application essentially in the flank region and optionally at the transition between the flank region and trough region of the surface structure and is available for further processes, such as shaping processes, preferably for deep-drawing processes, closer to or adjacent to locations that are relevant to the forming process, in order to improve lubrication and reduce friction on and thus wear of the shaping means, such as shaping devices, preferably (deep-drawing) presses. In particular, the process medium can be effectively prevented from accumulating at tribologically unfavorable regions that do not make a contribution to feeding process medium to the actual zone of contact or frictional zone. Consequently, the steel sheet according to the invention with little need for process medium has very good tribological properties and is more environmentally friendly in comparison with the in particular oiled steel sheets known from the prior art, in particular by virtue of using less resources.

According to a second aspect, the invention relates to a method for producing a steel sheet skin-pass rolled with a deterministic surface structure, comprising the following steps:

providing a steel sheet, skin-pass rolling the steel sheet by means of a skin-pass roller, wherein the surface of the skin-pass roller acting on the surface of the steel sheet is configured with a deterministic surface structure in such a way that, after the skin-pass rolling operation, the surface structure is impressed into the steel sheet starting from a surface of the steel sheet, wherein the surface structure comprises a flank region which runs from the surface to a trough region and wherein at least the flank region has a roughness Ra of greater than 20 nm.

Owing to the action of force on the surface of the steel sheet, the surface (positive shape) of the skin-pass roller forms a surface structure which defines a trough and flank region (negative shape) and corresponds substantially to the surface (positive shape) of the skin-pass roller. The skin-pass roller for forming a deterministic surface structure may be processed by suitable means, for example by means of a laser; cf. also EP 2 892 663 B1. Furthermore, other material removal methods can also be used to set a surface on a skin-pass roller, for example machining methods using a geometrically determined or undetermined cutting edge, chemical or electrochemical, optical or plasma-induced methods which are suitable for being able to implement a surface structure on a steel sheet to be skin-pass rolled, which steel sheet has a roughness Ra of greater than 20 nm at least in the flank region.

In order to avoid repetitions, reference is made in each case to the explanations relating to the steel sheet according to the invention that is skin-pass rolled with a deterministic surface structure.

According to one embodiment of the method according to the invention, the steel sheet is coated by hot-dip coating before the steel sheet is provided. The melt for the hot-dip coating may preferably contain, in addition to zinc and unavoidable impurities, additional elements such as aluminum with a content of up to 5% by weight and/or magnesium with a content of up to 5% by weight.

According to an alternative embodiment of the method according to the invention, the skin-pass rolled steel sheet is coated by electrolytic coating after the steel sheet has been skin-pass rolled.

According to one embodiment of the method according to the invention, after the skin-pass rolling, the steel sheet is additionally provided with process medium, preferably with oil, wherein the process medium is applied with an applied amount of up to 2 g/m², more preferably with an applied amount of up to 0.4 g/m².

Specific embodiments of the invention will be described in more detail below with reference to the drawing. The drawing and accompanying description of the resulting features are not to be read as limiting the respective embodiments but serve to illustrate the exemplary embodiment. Furthermore, the respective features can be used with one another and also with features of the above description for possible further developments and improvements of the invention, specifically in additional embodiments which are not illustrated. Identical parts are always provided with the same reference signs.

FIG. 1) illustrates a schematic partial sectional view of an exemplary embodiment according to the invention of a steel sheet (1, 1') skin-pass rolled with a deterministic surface structure (2). It is possible for the steel sheet (1, 1') to be an uncoated steel sheet (1), i.e. it does not have an in particular metallic coat or non-metallic coat, or a steel sheet (1') coated with a metallic coat (1.2). The surface structure (2) is impressed into the steel sheet (1, 1') starting from a surface (1.1) of the steel sheet (1), wherein the surface structure (2) comprises a flank region (2.3) which runs from the surface (1.1) to a trough region (2.2). At least the flank region (2.2) has a roughness Ra of greater than 20 nm. Depending on the material removal method used to process the corresponding skin-pass roller (not illustrated) for skin-pass rolling the steel sheet (1, 1'), the flank region (2.3) and the trough region (2.2) are set by the corresponding region (positive shape) on the skin-pass roller, which is not illustrated. Furthermore, it can be clearly seen in FIG. 1) that the surface structure (2) has a flank region (2.3) which runs from the surface (1.1) to a trough region (2.2) and is formed at an angle (a) of between 1° and 89° to the perpendicular (O) of the steel sheet (1, 1'). The flank region (2.3) forming and running peripherally around the surface structure (2), together with the trough region (2.2) connected or bonded in one piece to the flank region (2.3), defines a closed volume of the surface structure (2) impressed into the steel sheet (1, 1') by means of skin-pass rolling.

Figure 2A:
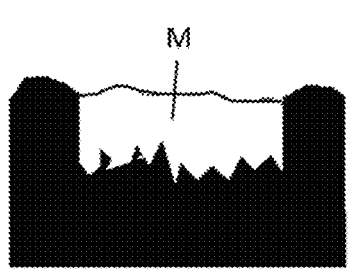

FIGS. 2a), 2b) and 2c) respectively show schematic partial sectional views of different surface structures on a skin-pass rolled steel sheet.

FIG. 2a) shows a schematic partial sectional view of an in particular coated steel sheet skin-pass rolled with a stochastic surface structure, the surface structure having been skin-pass rolled by means of an EDT-structured skin-pass roller (not illustrated). The surface structure is substantially completely filled or covered with a process medium (M), for example oil. The requirement for process media (M) is higher in comparison with the other two embodiments (FIGS. 2b) and 2c)), since the surface structure in the case of EDT is not realized as a closed structure but as an open structure.

Figure 2B:
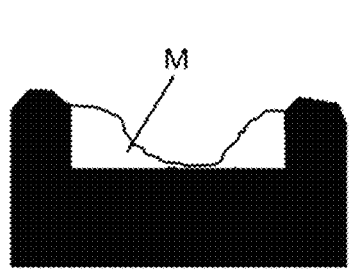

FIG. 2b) shows a schematic partial sectional view of an in particular coated steel sheet skin-pass rolled with a deterministic surface structure, the surface structure having been skin-pass rolled by means of a laser-structured skin-pass roller (not illustrated); cf. EP 2 892 663 B1. In comparison with FIG. 2a), it is possible to use less process media (M) since the surface structure is closed.

Figure 2C:
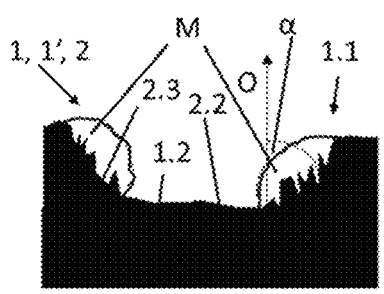

The configuration according to the invention of an in particular coated steel sheet (1, 1') skin-pass rolled with a deterministic surface structure (2) is illustrated schematically in FIG. 2c) in a partial sectional view, the surface structure (2) having been skin-pass rolled by means of a laser-structured skin-pass roller (not illustrated): cf. also EP 2 892 663 B1, but with the difference that the roughness in the positive shape on the surface of the skin-pass roller has been set in a defined manner in the flank region (2.3) to be produced that acts on the steel sheet (1, 1'), with the result that, on the skin-pass rolled steel sheet (1, 1'), a deterministic surface structure (2) is set in the flank region (2.3) having a roughness Ra of greater than 20 nm, in particular greater than 50 nm, preferably greater than 100 nm, preferably greater than 150 nm, more preferably greater than 200 nm. This makes it possible, in comparison with the other embodiments (FIGS. 2a) and 2b)), to further minimize the need for process media (M) and to store it closer to or adjacent to the locations (1.1) that are relevant to the forming process.

Figures 3A, 3B:
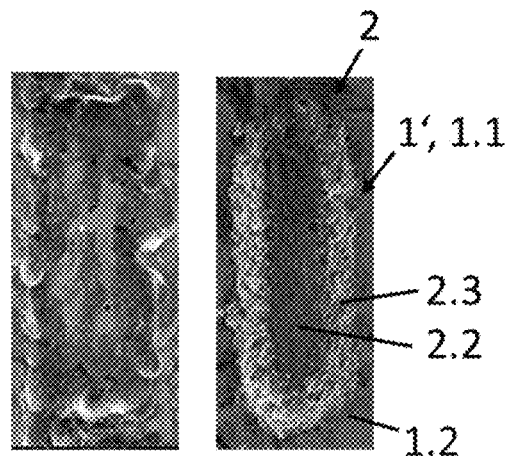

A deterministic surface structure has been analyzed using the example of a constantly recurring I-shaped impression. Other embodiments are likewise conceivable and applicable and are not restricted to an I-shaped impression. FIG. 3a) illustrates an SEM image of a sheet topography provided with a zinc-based coat, the surface structure having been impressed by means of a skin-pass roller (not illustrated), the surface of the skin-pass roller having been structured by means of a laser; cf. EP 2 892 663 B1. FIG. 3b) illustrates an SEM image of the topography or deterministic surface structure (2) of a steel sheet (1') skin-pass rolled with a zinc-based coat (1.2), the surface structure (2) having been impressed by means of a skin-pass roller (not illustrated), the surface of the skin-pass roller having been structured by means of a laser: cf. EP 2 892 663 B1, but with the difference that the roughness Ra in the positive shape on the surface of the skin-pass roller has been set in a defined manner in the flank region (2.3) to be produced that acts on the coated steel sheet (1'). The differently formed flank regions of the respective I-structure are clearly visible.

Using the example of the embodiment according to FIG. 3b), two uncoated and two hot-dip coated steel sheets (1, 1') were skin-pass rolled with a deterministic surface structure. The flank regions of the sheet topography were analyzed by atomic force microscopy (AFM). The scanning area of the atomic force microscopy had a surface area of 90×90 μm$^2$, the roughness Ra in the flank region having been determined on a surface area of 20×2 μm$^2$ within the scanning area. For the two uncoated, skin-pass rolled steel sheets (1), the respective values Ra=45.99 nm and Ra=51.48 nm were determined, and for the two coated, skin-pass rolled steel sheets (1'), the respective values Ra=131.07 nm and Ra=205.40 nm were determined.

Four coated, skin-pass rolled steel sheets (V1 to V4) were used for further analysis. The type of coating was selected to be the same for all of the steel sheets: a zinc-based coat (zinc and unavoidable impurities), which was applied in the hot-dip coating process and was approx. 7 μm thick. V1 and V2 correspond to steel sheets (1') according to the invention and V3 and V4 are reference sheets. V3 and V4 are different with respect to V1 and V2 in that V3 and V4 were skin-pass rolled with a skin-pass roller having a deterministic surface structure and an undefined flank region (cf. embodiment in FIG. 3a). Table 1 reports a comparison of the steel sheets (1') according to the invention and reference sheets.

TABLE 1

| Steel sheets | Ra [nm] flank region | Oil [g/m$^2$] | Cup-drawing test | Adhesion test |
|---|---|---|---|---|
| V1 | 131.07 | <0.8 | ++ | ++ |
| V2 | 205.40 | <0.8 | +++ | + |
| V3 | <20 | 1.0 | + | 0 |
| V4 | <20 | 1.3 | + | 0 |

The roughness Ra (arithmetic mean roughness value) was determined using the method specified in DIN EN ISO 4287 and the numerical values in the table relate to a surface area of 20×2 μm$^2$, which only included the flank region. The roughness Ra of the steel sheets V3 and V4 was very small in the flank region. The information in Table 1 relating to a strip-drawing test, the cup-drawing test according to DIN EN 1669, which was carried out under the same conditions for all four steel sheets V1 to V4, essentially shows a positive result. The evaluation was based on the following criteria:

+++ means that no thinning-out is visible,
++ means that both the coefficient of friction determined during the strip-drawing test and the thinning-out of the formed steel sheet at the run-out of the edge of the stamp are lower (slight thinning-out of less than 5% of the initial thickness of the steel sheet),
+ means that the minimum thinning-out of the formed steel sheet is more than 5% but less than 10% of the initial thickness of the steel sheet.

The information in Table 1 relating to the lap shear test on the basis of DIN EN 1465, which was carried out under the same conditions for all four steel sheets V1 to V4, shows different results in terms of the suitability for adhesion. The fracture behavior is evaluated on the basis of DIN EN ISO 10365, the numerical values specified below having been determined using empirical values. The evaluation was based on the following criteria:

++ means that the proportion of the cohesive fracture surface area that was present as a fracture surface area in the adhesive in the course of the lap shear test was at least 85%,
+ means that the proportion of the cohesive fracture surface area that was present as a fracture surface area in the adhesive in the course of the lap shear test was between 60% and 85%, 0 means that the proportion of the cohesive fracture surface area that was present as a fracture surface area in the adhesive in the course of the lap shear test was between 40% and 60%.

In addition, at the same time it was possible to reduce the amount of process medium (M) applied to the steel sheet V1 and V2, that is coated according to the invention and skin-pass rolled with a deterministic surface structure, to below 1 g/m$^2$, and the amount was sufficient to achieve a correspondingly good result.

The invention claimed is:

1. A steel sheet skin-pass rolled with a deterministic surface structure, wherein the surface structure is impressed into the steel sheet starting from a surface of the steel sheet, wherein the surface structure comprises a flank region that runs from the surface to a trough region, wherein the flank region has a roughness Ra of greater than 20 nm to less than 300 nm wherein the steel sheet further comprises a zinc-based metallic coat which is applied by hot-dip coating, wherein the coat contains in addition to zinc and unavoidable impurities, additional elements including at least one of aluminum with a content of up to 5% by weight and magnesium with a content of up to 5% by weight in the coat, wherein the steel sheet is additionally provided with a process medium with an applied amount of up to 2 g/m².

2. The steel sheet as claimed in claim 1, wherein the flank region is formed at an angle (a) of between 1° and 89° to the perpendicular (O) of the steel sheet.

3. The steel sheet of claim 2 wherein the angle (α) is between 60 degrees and 85 degrees.

4. The steel sheet of claim 3 wherein the angle (α) is between 65 degrees and 82 degrees.

5. The steel sheet of claim 2 wherein the coat has a thickness of between 2 and 12 μm.

6. The steel sheet of claim 5 wherein the coat has a thickness of between 3 and 10 μm.

7. The steel sheet of claim 1 wherein the Ra is greater than 200 nm.

8. A steel sheet skin-pass rolled with a deterministic surface structure, wherein the surface structure is impressed into the steel sheet starting from a surface of the steel sheet, wherein the surface structure comprises a flank region that runs from the surface to a trough region, wherein the flank region has a roughness Ra of greater than 20 nm to less than 300 nm, wherein the steel sheet further comprises a zinc-based coat which is applied by electrolytic coating, wherein the steel sheet is additionally provided with a process medium with an applied amount of up to 2 g/m².

9. A steel sheet skin-pass rolled with a deterministic surface structure, wherein the surface structure is impressed into the steel sheet starting from a surface of the steel sheet, wherein the surface structure comprises a flank region that runs from the surface to a trough region, wherein the flank region has a roughness Ra of greater than 100 nm and less than 300 nm, wherein the steel sheet further comprises a zinc-based metallic coat which is applied by hot-dip coating, wherein the coat contains in addition to zinc and unavoidable impurities, additional elements including at least one of aluminum with a content of up to 5% by weight and magnesium with a content of up to 5% by weight in the coat, wherein the steel sheet further includes oil deposited thereon of up to 1.5 g/m².

10. A steel sheet skin-pass rolled with a deterministic surface structure, wherein the surface structure is impressed into the steel sheet starting from a surface of the steel sheet, wherein the surface structure comprises a flank region that runs from the surface to a trough region, wherein the flank region has a roughness Ra of greater than 100 nm and less than 300 nm, wherein the steel sheet further comprises a zinc-based metallic coat which is applied by electrolytic coating, wherein the steel sheet further includes oil deposited on the coat of up to 1.5 g/m².

11. The steel sheet of claim 10 wherein the oil is deposited only at the flank region.

\* \* \* \* \*